(No Model.)
E. M. BENTLEY.
ELECTRIC RAILWAY.
No. 322,517. Patented July 21, 1885.
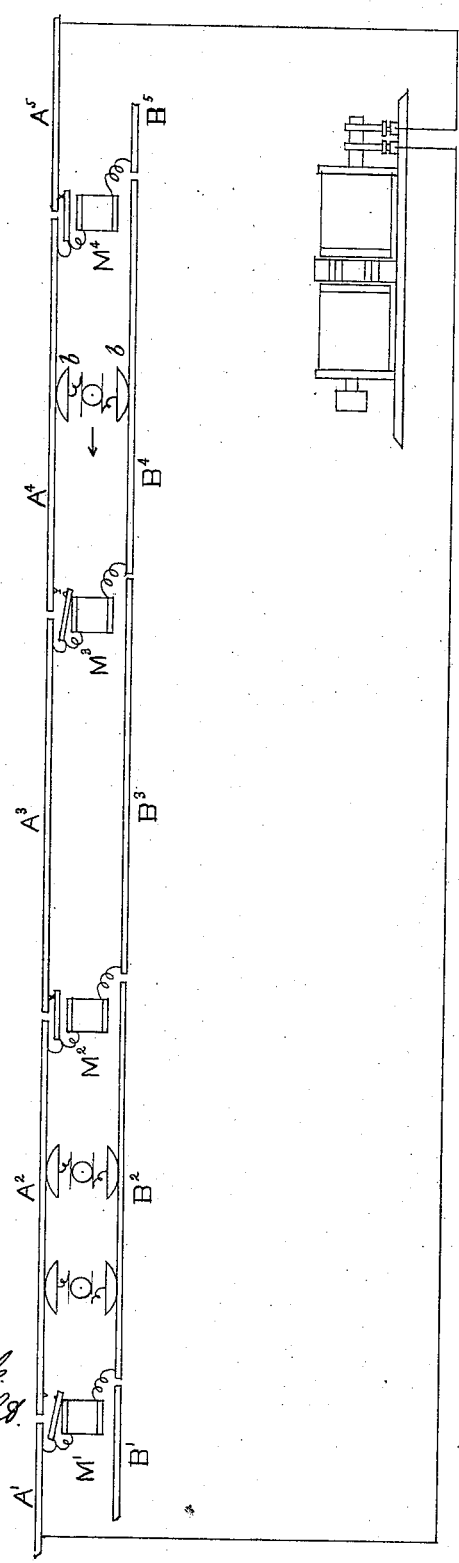
WITNESS.
Geo. S. Wheelock
H. S. Knight
INVENTOR.
Edward M. Bentley
by Bentley & Knight
Attys.

United States Patent Office.

EDWARD M. BENTLEY, OF BROOKLYN, NEW YORK.

ELECTRIC RAILWAY.

SPECIFICATION forming part of Letters Patent No. 322,517, dated July 21, 1885.

Application filed July 5, 1884. (No model.)

*To all whom it may concern:*

Be it known that I, EDWARD M. BENTLEY, a citizen of the United States, residing at Brooklyn, New York, have invented certain new and useful Improvements in Electric Railways, of which the following is a specification.

This application is a division of one filed by me on the 29th day of December, 1883.

My invention consists in certain arrangements of conductors of an electric railway with suitable switches, whereby the propelling-motors along the line may be in series with one another.

The accompanying drawing is a diagrammatic view of my invention.

In the drawing, $A'$ $A^2$ $A^3$ $A^4$, &c., and $B'$ $B^2$ $B^3$ $B^4$, &c., are sectional electric conductors extending along the line of an electric railway, and adapted to supply current to the propelling-motors whose terminals are in connection therewith through the sliding contact-pieces $b\ b$. Each section of the series B is in permanent connection with the opposite and succeeding section of the series A. Thus $A'$ is connected to $B^2$, $A^2$ to $B^3$, &c. Each of these cross-connections includes an electro-magnet, M, which, when energized, acts to operate an electric switch and break connection between the succeeding sections of series A. The terminal sections of series A are connected to the respective poles of the supplying-generator.

The magnets M are preferably wound with a very few turns of coarse wire in the line-circuit, but a branch-circuit magnet may be used.

Suppose a locomotive is on a section, as $A^4$ $B^4$, with its two motor-terminals in connection with brushes $b\ b$. If the connection between $A^4$ and $A^3$ is unbroken, the main part of the current will pass over that connection, but a branch current will also pass from one brush $b$, in connection with $A^4$ and the generator, through the motor to $B^4$, and by cross-connection, including magnet M, to $A^3$. This branch current will be of sufficient strength to energize magnet M, which will act to break the connection between $A^3$ and $A^4$, and thus force all the current to go through the motor. The branch current will be stronger if the motor is thrown on short circuit.

Suppose the locomotive to be moving in the direction of the arrow, when it reaches the end of the section, the lower brush $b$ passes first from $B^4$ onto $B^3$, thereby de-energizing magnet M, and thus closing the circuit between $A^3$ and $A^4$, while at the same time it energizes a succeeding magnet, M', and thereby opens the circuit between $A^3$ and $A^2$. The upper brush then passes from $A^4$ to $A^3$, and the current now passes from $A^3$ through the motor to $B^3$, and thence through magnet M' to $A^2$, and on. The arrangement is shown as such that the lower brush makes contact with $B^3$ before the upper one makes contact with $A^3$, though they may both make contact simultaneously, but with increased danger of sparking.

Should the main circuit be broken at any motor, the switch-magnets along the line will be demagnetized and release their armatures, so as to restore the continuity of the main circuit. When the circuit has been thus restored, the magnets will be instantly re-energized, with the exception of the one on the section where the faulty motor is. On that section, there being no course for the current through the motor, none will pass through the magnet, which depends for its current upon the presence of a perfect motor or other path for the current between the two conductors of the section. Since the contact devices make connection with the conductor of one section before leaving that of the preceding section, by means of the diagonally-opposite overlapping conductors, the continuity of the main circuit is preserved during the operation of the switch-magnets.

What I claim is—

1. The combination of sectional conductors extending along an electric railway, two opposite conductors in succeeding sections, being connected as described, electric locomotives in circuit between opposite sections and in series with one another, and an electric switch at the end of each section for breaking connection between two successive sections.

2. The combination of two sectional conductors extending along an electric railway, two opposite conductors in succeeding sections being connected as described, electric locomotives in series making connection therewith, and an electric switch at the end of each section for controlling the connection between successive sections of one conductor.

3. The combination of a vehicle, a propelling electric motor therefor in series with other motors on the same road, bared conductors adapted for conveying the main current extending along the said road, a constant connection between said conductors and the motors, and electrically-operated switches for shunting the main current through said motors.

4. The combination of a vehicle, a propelling electric motor therefor in series with other motors on the same road, bared conductors adapted for conveying the main current extending along said road, switches operated electrically for shunting the main current through said motor, and means for preserving the continuity of the main line during the operation of said switches.

5. The combination of a vehicle, a propelling motor in series with other motors on the same road, bared conductors extending along said road and adapted for carrying the main current, electric switches operated from a distance for directing the course of the main current over said conductors, and electrical devices for operating said switches controlled by the current which passes over said conductors between said motor and the adjacent switch.

6. The combination of two conductors parallel with the line of an electric railway, electric locomotives in electrical connection with said conductors, said conductors being divided into insulated sections, each section of one conductor being connected with the opposite succeeding section of the other conductor, and cross-connections containing electrical devices which control a connection between successive sections of the other conductor.

7. The combination of two or more electric motors in series, a vehicle supporting each motor and propelled thereby, a sectional electric conducting-path extending along the line of progress of said vehicles, conductors extending from each motor and making continuous connection with said conducting-path, the main current normally passing through the motors in succession, and an automatic circuit-closer for each motor acting to preserve the continuity of the main line in the case of rupture of any motor-circuit.

8. The combination, in an electric railway, of two conductors extending along the line of the road and divided into sections longer than the ordinary locomotives or trains on the road, electric locomotives having their motor-terminals constantly in connection with the two conductors, respectively, and switches operated by the progress of the train or locomotive for sending the main current through the motors in succession.

9. The combination, with the two main conductors of an electric railway, of an electric locomotive having its terminals in connection with said conductors, respectively, a connection between said conductors, and a circuit-breaker in said connection controlled by the progress of said locomotive.

10. The combination of two sectional conductors extending along an electric railway, each section of one conductor being electrically connected with the preceding section of the other conductor, locomotives in series in traveling connection with said conductors, and circuit-controllers between the successive sections of one of the conductors.

EDWARD M. BENTLEY.

Witnesses:
L. M. HOPKINS,
GEO. S. WHEELOCK.